INVENTOR
MAX G. BALES

HIS ATTORNEYS

Patented May 26, 1953

2,639,701

UNITED STATES PATENT OFFICE 2,639,701

VENTILATING SYSTEM FOR SEALED IGNITION DISTRIBUTORS AND ENGINE CRANKCASES

Max G. Bales, Anderson, Ind., assignor to General Motors Corporation, Detroit, Mich., a corporation of Delaware Application January 17, 1951, Serial No. 206,458

6 Claims. (Cl. 123—119)

1

This invention relates to automotive vehicles which are required to ford streams of such depths that the engine may be submerged.

An object of the invention is to provide a ventilating system for the engine crank case and the ignition distributor having means for preventing entrance of water when fording. Therefore the system provides a plurality of valves which are closed in a certain sequence preparatory to fording and are opened in a certain sequence after fording.

Further objects and advantages of the present invention will be apparent from the following description, reference being had to the accompanying drawings wherein a preferred embodiment of the present invention is clearly shown.

Figure 1:
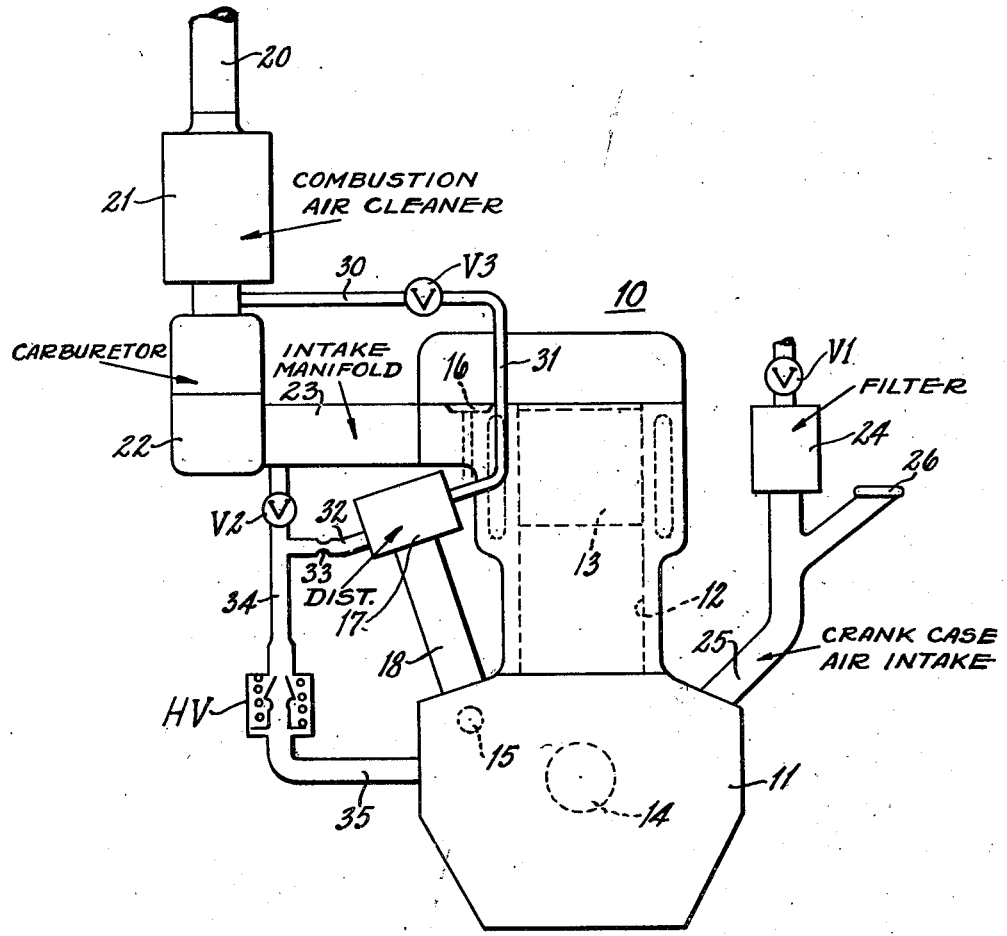
Fig. 1 is a diagram of a ventilating system embodying the invention.

Referring to the Fig. 1, an engine 10 includes a crank case 11 supporting a plurality of cylinders one of which is shown at 12. Each cylinder receives a piston 13 connected with a crank shaft 14 which through gears, not shown, drives a cam shaft 15 for controlling the engine valves one of which is shown at 16. Shaft 15 drives an ignition distributor 17 the housing of which includes a tubular member 18 supported by the crank case 11 and enclosing a shaft which transmits motion from the shaft 15 to moving parts of the distributor.

Air enters through a pipe 20 and passes through an air cleaner 21 and into a carburetor 22 connected with engine intake manifold 23. Air for crank case ventilation passes through a valve V1, when, open, an air filter 24, and a pipe 25 connected with crank case 11. Through pipe 25 engine oil can be introduced after removal of a filler cap 26.

Air for ventilating distributor 17 flows from the air cleaner 21 through a pipe 30, valve V3, when open, and pipe 31 connected with the interior of the distributor housing which is connected by a pipe 32 having a restriction 33 and connected with a pipe 34 which a valve V2, when opened, places in communication with an intake manifold 23.

Figure 2:
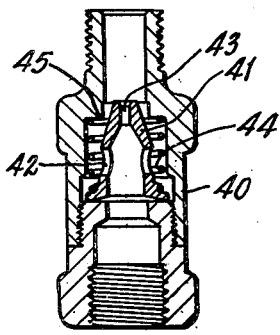
Fig. 2 is an enlarged sectional view of a valve HV included in Fig. 1.

The crank case 11 is connected by pipe 35 and a valve HV with pipe 34. The valve HV includes a housing 40 (Fig. 2) which encloses a valve member 41 having side holes 42 and a smaller hole 43. A spring 44 normally holds valve 41 in open position when intake suction is relatively

2 low as occurs when the engine is operating with the throttle wide open. When the engine idles and the intake suction is high, spring 44 is overcome and valve 41 engages a seat 45 so that the small hole 43 of the valve provides the sole connection between the pipes 35 and 34. The function of valve HV is to limit the suction in the crank case 11 when the engine is idling or operating at part throttle while providing sufficient suction for crank case ventilation when the engine is operating with the throttle wide open.

When the vehicle is not fording, valves V1, V2 and V3 are opened. To purge the crank case 11 from gases which blow by the piston 13, engine operation causes circulation of air through valve V1, filter 24, pipe 25 into said crank case 11 and out through pipe 35, valve HV, pipe 34 and valve V2 into intake manifold 23. Air for ventilating of the housing of distributor 17 is induced to flow, during operation of the engine, through pipe 30, valve V3, pipe 31, distributor housing 17, pipe 32, restriction 33, pipe 34, and valve V2 and into the intake manifold 23.

The housing 17 of the distributor has a connection with the crank case through the housing supporting member 18 which encloses the shaft which connects the distributor mechanism with the engine cam shaft 15. Therefore, the restriction 33 in pipe 32 is provided so that suction in the distributor housing will not exceed suction in the crank case 11. If suction in the distributor housing exceeded suction in the crank case 11, oil which is churned around in the crank case during operation of the engine might be sucked into the distributor.

During fording the valves V1, V2 and V3 are closed to prevent entrance of water. This is important because there is a pressure built up in the crank case and the distributor ventilating system caused by piston flow by which is required to prevent entrance of water around the various seals in the engine.

In preparation for fording valve V3 is closed first in order to cut off suction in the housing of the distributor 17 and then valves V1 and V2 are closed. If valve V3 were closed after closing valves V1 and V2 there would be an interval of time during which the crank case 11 and the distributor housing would be under suction and churning crank case oil would be drawn into the distributor. The closing of valves V1, V2 and V3 seals the ventilation system against the entrance of water, pipe 20 extending above the level of the stream through which the vehicle must pass.

After fording valves V1 and V2 are opened first and valve V3 is then opened. In this way there is no interval of time during which the distributor housing is subjected to suction in excess of crank case suction.

While the embodiment of the present invention as herein disclosed, constitutes a preferred form, it is to be understood that other forms might be adopted.

What is claimed is as follows:

1. A ventilating system for a crank case and a sealed distributor of an internal combustion engine comprising an intake manifold associated with the engine; air entrance ducts associated with the crank-case and the distributor; air outlet ducts associated with the crank case, the distributor, and the intake manifold for ventilating the crank case and the distributor; and valve means for closing the ducts for sealing the ventilating system against entrance of water.

2. A ventilating system for a crank case and a sealed distributor for an internal combustion engine comprising, a manifold associated with the engine; an air entrance duct associated with the crank case; an air entrance duct associated with the distributor; an air outlet passageway associated with the crank case and the manifold; a second air outlet passageway associated with distributor and the first passageway; and valve means for closing the passageways and the air entrances for sealing the ventilating system against entrance of water whenever fording.

3. A ventilating system for a crank case and a sealed distributor for an internal combustion engine comprising, a manifold associated with the engine; an air entrance duct associated with the crank case; an air entrance duct associated with the distributor; an air outlet passageway associated with the crank case and the manifold; a second air outlet passageway associated with distributor and the first passageway; and manually operated valves for closing the air entrance ducts and the air outlet ducts for sealing the ventilating system against entrance of water before fording, said valve in the distributor air entrance duct being closed in advance of the other valves so that suction in the distributor is cut off to prevent oil in the crank case being drawn into the distributor, and after fording said valve is opened subsequent the opening of the other valves.

4. A ventilating system for a crank-case and a sealed distributor of an internal combustion engine; an intake manifold associated with the engine; an air entrance duct associated with the crank-case; an air entrance duct associated with the distributor; an air outlet duct associated with the crank-case and the manifold; a second air outlet duct having a restriction formed therein associated with the distributor and the first air outlet duct; and valve means for closing the air entrance ducts and the air outlet ducts for sealing the ventilating system against entrance of water whenever fording.

5. A ventilating system for a crank-case and a sealed distributor of an internal combustion engine; an intake manifold associated with the engine; an air entrance duct associated with the crank-case; an air entrance duct associated with the distributor; an air outlet duct associated with the crank-case and the manifold; a second air outlet duct associated with the distributor and the first air outlet duct; means for restricting the passage in the second air outlet duct so that suction in distributor will not exceed suction in crank-case; and manually operated valve means for closing the air entrance ducts and the air outlet ducts for sealing the ventilating system against entrance of water whenever fording.

6. A ventilating system for a crank-case and a sealed distributor of an internal combustion engine; an intake manifold associated with the engine; an air entrance duct associated with the crank-case; an air entrance duct associated with the distributor; an air outlet duct associated with the crank-case and the manifold; a second air outlet duct associated with the distributor and the first air outlet duct; means for restricting the passageway through the second air duct so that suction in the distributor will not exceed suction in the crank-case; a biased valve slidably mounted in the first air outlet duct, said valve adapted to limit the suction in the crank-case when the engine is idling or operating at part throttle; and manually operated valves for closing the air entrance ducts and the air outlet ducts for sealing the ventilating system against entrance of water whenever fording.

MAX G. BALES.

References Cited in the file of this patent

UNITED STATES PATENTS

| Number | Name | Date |
| --- | --- | --- |
| 2,060,883 | Lowther | Nov. 17, 1936 |
| 2,149,516 | Flamm | Mar. 7, 1939 |
| 2,423,592 | Foster | July 8, 1947 |